US012190170B2

(12) United States Patent
Yun et al.

(10) Patent No.: US 12,190,170 B2
(45) Date of Patent: Jan. 7, 2025

(54) VIRTUAL MACHINE PLACEMENT SYSTEM AND VIRTUAL MACHINE PLACEMENT METHOD FOR IMPLEMENTING PREDICTION MANAGEMENT OF VIRTUAL MACHINES CONSIDERING PERFORMANCE DEGRATION OF PHYSICAL SERVER

(71) Applicant: OKESTRO CO., LTD., Seoul (KR)

(72) Inventors: Ho Yeong Yun, Seoul (KR); Hyun Suk Jang, Seoul (KR); Yoo Jong Lee, Seoul (KR); Young Gwang Kim, Seoul (KR); Min Jun Kim, Seoul (KR)

(73) Assignee: OKESTRO CO., LTD., Seoul (KR)

( * ) Notice: Subject to any disclaimer, the term of this patent is extended or adjusted under 35 U.S.C. 154(b) by 478 days.

(21) Appl. No.: 17/645,833

(22) Filed: Dec. 23, 2021

(65) Prior Publication Data

US 2023/0124020 A1  Apr. 20, 2023

(30) Foreign Application Priority Data

Oct. 15, 2021 (KR) .......................... 10-2021-0137359

(51) Int. Cl.
*G06F 9/50* (2006.01)
*G06F 9/455* (2018.01)

(52) U.S. Cl.
CPC ........ *G06F 9/5077* (2013.01); *G06F 9/45558* (2013.01); *G06F 9/505* (2013.01);
(Continued)

(58) Field of Classification Search
CPC ........... G06F 2009/4557; G06F 3/0662; G06F 9/455; G06F 9/45504; G06F 9/45533;
(Continued)

(56) References Cited

U.S. PATENT DOCUMENTS

| 9,529,641 | B2* | 12/2016 | Civilini | .............. G05D 23/1917 |
| 10,925,191 | B2* | 2/2021 | Kommula | ................ G06F 30/20 |
| 11,875,191 | B1* | 1/2024 | Plenderleith | .......... G06F 9/5094 |

FOREIGN PATENT DOCUMENTS

| JP | 2010-165265 A | 7/2010 |
| KR | 10-2016-0049006 A | 5/2016 |
| KR | 10-2135208 B1 | 7/2020 |

OTHER PUBLICATIONS

Ho Yeong Yun, "Energy-Efficient Management of Virtual machine Consolidation in Data Centers under Uncertainty", A Dissertation Submitted to the Department of Industrial Engineering and the Graduate School of Yonsei University in partial fulfillment of the requirements for the degree of Doctor of Philosophy in Industrial Engineering, Feb. 2021, 5 pages.

* cited by examiner

*Primary Examiner* — Andy Ho
(74) *Attorney, Agent, or Firm* — Sughrue Mion, PLLC

(57) ABSTRACT

A virtual machine placement system for placing a plurality of virtual machines on a first physical server and a second physical server in order to efficiently operate a physical server in which the plurality of virtual machines are installed is disclosed. The physical server includes the first physical server and the second physical server, the virtual machine placement system contains a workload calculation module, a prediction module, a temperature prediction module, a schedule module, and a migration module, wherein the schedule module calculates a placement schedule considering predicted temperature of the physical server.

13 Claims, 12 Drawing Sheets

(52) U.S. Cl.
CPC .............. *G06F 2009/4557* (2013.01); *G06F 2009/45591* (2013.01)

(58) Field of Classification Search
CPC ........ G06F 9/4856; G06F 9/50; G06F 9/5011; G06F 9/5077
See application file for complete search history.

| INDIVIDUAL SERVER | 1 | 2 | 3 | 4 | 5 |
|---|---|---|---|---|---|
| PREDICTED TEMPERATURE | 22 | 28 | 25 | 27 | 23 |
| MEASURED TEMPERATURE | 21 | 29 | 32 | 25 | 21 |

FIG. 8B

| INDIVIDUAL SERVER | 1 | 2 | 3 | 4 | 5 |
|---|---|---|---|---|---|
| PREDICTED TEMPERATURE | 22 | 28 | 25 | 27 | 23 |
| MEASURED TEMPERATURE | 38 | 39 | 38 | 40 | 41 |

FIG. 8C

| Factors | Contents |
|---|---|
| Lifetime ($\lambda^L$) | · PERFORMANCE OF SERVER IS DEGRADED BY 14% PER YEAR<br>· ASSUME THAT PERFORMANCE DEGRADATION OF SERVER HAS LINEAR RELATIONSHIP WITH OPERATING TIME |
| On/Off Cycle ($\lambda^C$) | · FREQUENT ON/OFF AFFECTS DISK WEAR<br>· $AFR(f) = \varphi e^{-5} f^2 - \delta e^{-4} f + \upsilon e^{-4}$, ($\varphi=3.02, \delta=2.18, \upsilon=2.78$) |
| Temperature ($\lambda^T$) | · TEMPERATURE OF SERVER HAS LINEAR RELATIONSHIP WITH CPU USAGE RATE<br>· $AF_j = e^{-\frac{\Delta E}{KT}\left(\frac{1}{T_{after}} - \frac{1}{T_{before}}\right)}$ |

FIG. 9

VIRTUAL MACHINE PLACEMENT SYSTEM AND VIRTUAL MACHINE PLACEMENT METHOD FOR IMPLEMENTING PREDICTION MANAGEMENT OF VIRTUAL MACHINES CONSIDERING PERFORMANCE DEGRATION OF PHYSICAL SERVER

GOVERNMENT SUPPORT

This invention was made with government support under Grant Identification No. 1711134449, Grant No. 2021-0-00256 awarded by The Ministry of Science and ICT of Republic of Korea, Institute for Information & Communication Technology Planning & Evaluation, under the Research Project Name: Information and Communication Broadcasting Technology Development, Research Item Name: Development of Heterogeneous Virtualization$^{(VM+Container)}$ Integrated Operation Technology for Intelligent Management of Cloud Resources, Research Period from Apr. 1, 2021, to Dec. 31, 2023.

CROSS-REFERENCE TO RELATED APPLICATION

This application claims the benefit of Korean Patent Application No. 10-2021-0137359, filed on 10.15, 2021, in the Korean Intellectual Property Office, the disclosure of which is incorporated herein in its entirety by reference.

BACKGROUND

1. Field

The present invention relates to a virtual machine placement system and a virtual machine placement method for placing the virtual machine considering performance degration of the physical server.

2. Description of Related Art

Data centers, which account for about 2% of the world's electricity consumption, are high-density, energy-consuming buildings that consume the most electricity among single buildings, but show inefficient operations by adhering to conservative operations that prioritize stability. In the future, due to the spread of Internet of Things, big data, and cloud technologies, it is expected that small data centers will be integrated into large-scale 'hyperscale' and 'mega' data centers. Thus, as the infrastructure expands, the complexity of data center operation and management is also expected to intensify. In this regard, unnecessary servers are switched to an idle mode or a power-saving mode, and running virtual machines can be moved to appropriate physical servers in order to take the most use of available servers. This is referred to as live migration. This is an essential management method for efficient data center management. However, migration has disadvantages such as risk of data loss and occupying a large portion of resources.

According to the existing studies (Japanese Patent No. 5827594, registered on Oct. 23, 2015), when a load above a threshold value is applied to a physical server at a specific time point, migration is performed to reduce the load of the loaded physical server, thereby balancing physical servers. However, since these methods do not consider the temperature of the physical server, there is a problem in that the performance of the virtual machine is degraded by the temperature of the physical server.

SUMMARY

The present invention has been made in an effort to solve the above-described problems, and aims to provide a virtual machine placement system and a virtual machine placement method that consider performance degration of the physical server to place the virtual machine based on the predicted workload.

However, the technical problems to be achieved by the present embodiment are not limited to the technical problems described above, and other technical problems may exist.

According to an embodiment of the present invention, there is provided a virtual machine placement system for placing a plurality of virtual machines on a first physical server and a second physical server in order to efficiently operate a physical server in which the plurality of virtual machines are installed, the physical server including the first physical server and the second physical server, the virtual machine placement system including: a workload calculation module that calculates a virtual machine workload that is a load imposed on the physical server by implementing the virtual machine by using a predetermined workload calculation method; a prediction module that calculates an initial predicted virtual load that is a load expected to be imposed on the physical server by the virtual machine during a first predetermined period based on the virtual machine workload; a schedule module that calculates a placement schedule that is a schedule in which the plurality of virtual machines are placed on the first physical server and the second physical server by a predetermined placement schedule calculation method; and a migration module that migrates the plurality of virtual machines so that the plurality of virtual machines are placed on the first physical server and the second physical server according to the placement schedule, wherein the schedule module calculates the placement schedule satisfying a constraint condition by the predetermined placement schedule calculation method that is a method of calculating the placement schedule when the value of an objective function is minimized based on the initial predicted virtual load, and the constraint condition includes a performance condition considering the performance of the physical server.

In addition, the performance condition may be a condition excluding the placement of the virtual machine in the physical server having a performance index less than or equal to a predetermined performance index.

In addition, the performance index calculation module may calculate the performance index of the physical server considering a first performance degradation value related to performance degradation of the physical server according to an operating time.

In addition, the performance index calculation module may calculate the performance index of the physical server considering a second performance degradation value related to performance degradation of the physical server according to on/off of the physical server.

In addition, the performance index calculation module may calculate the performance index of the physical server considering a third performance degradation value related to performance degradation of the physical server according to a temperature of the physical server.

In addition, the objective function may include a cost objective function considering migration cost.

In addition, the migration cost may be a value calculated considering at least one of a first cost associated with a memory size of the virtual machine, a second cost associated with a dirty page ratio of the memory of the virtual machine, and a third cost associated with application sensitivity of the virtual machine.

In addition, the objective function may further include at least one of a second objective function that is a function related to an operating time of the physical server during the first predetermined period, a third objective function that is a function related to an amount of change in the load of the physical server calculated by the initial predicted virtual load during the first predetermined period, and a fourth objective function that is a function related to a difference between loads of the physical servers calculated by the initial predicted virtual load during the first predetermined period.

According to an embodiment of the present invention, there is provided a virtual machine placement method, implemented by a virtual machine placement system, for placing a plurality of virtual machines on a first physical server and a second physical server in order to efficiently operate a physical server in which the plurality of virtual machines are installed, the physical server including the first physical server and the second physical server, the virtual machine placement method including: calculating a virtual machine workload that is a load imposed on the physical server by implementing the virtual machine through a predetermined workload calculation method based on information related to operations of the first physical server and the second physical server; calculating an initial predicted virtual load that is a load predicted to be imposed on the physical server by the virtual machine during a first predetermined period based on the virtual machine workload; calculating a performance index that is the performance of the physical server; calculating a placement schedule that is a schedule for placing the virtual machines on the first physical server and the second physical server by a predetermined placement schedule calculation method; and migrating the virtual machines so that the virtual machines are placed on the first physical server and the second physical server according to the placement schedule, wherein the placement schedule satisfying a constraint condition is calculated by the predetermined placement schedule calculation method that is a method of calculating the placement schedule when the value of an objective function is minimized based on the initial predicted virtual load, and the constraint condition includes a performance condition considering the performance of the physical server.

In addition, the performance condition may be a condition excluding the placement of the virtual machine in the physical server having a performance index less than or equal to a predetermined performance index.

In addition, the performance index may be calculated considering all of a first performance degradation value related to performance degradation of the physical server according to the operating time, a second performance degradation value related to performance degradation of the physical server according to on/off of the physical server, and a third performance degradation value related to performance degradation of the physical server according to the temperature of the physical server.

In addition, the objective function may include a cost objective function considering migration cost.

According to an embodiment of the present invention, there is provided a virtual machine placement system for placing a plurality of virtual machines on a first physical server and a second physical server in order to efficiently operate a physical server in which the plurality of virtual machines are installed, the physical server including the first physical server and the second physical server, the virtual machine placement system including: a workload calculation module that calculates a virtual machine workload that is a load imposed on the physical server by implementing the virtual machine by using a predetermined workload calculation method; a prediction module that calculates an initial predicted virtual load that is a load expected to be imposed on the physical server by the virtual machine during a first predetermined period based on the virtual machine workload; a temperature prediction module that predicts a temperature of the physical server during the first predetermined period based on the initial predicted virtual load; a schedule module that calculates a placement schedule that is a schedule in which the plurality of virtual machines are placed on the first physical server and the second physical server by a predetermined placement schedule calculation method; and a migration module that migrates the plurality of virtual machines so that the plurality of virtual machines are placed on the first physical server and the second physical server according to the placement schedule, wherein the schedule module calculates the placement schedule considering the predicted temperature of the physical server.

In addition, the predetermined placement schedule calculation method may be a method of calculating the placement schedule when the value of an objective function is minimized based on the initial predicted virtual load, and the objective function may include a first objective function that is a function considering the temperature of the physical server.

In addition, the first objective function may be a function considering the number of spots having a temperature higher than or equal to a first reference on the physical server during the first predetermined period.

In addition, the objective function may further include objective functions other than the first objective function, and the schedule module may calculate the placement schedule by setting weights between the objective functions, and calculate the placement schedule by increasing a weight of the first objective function as the number of spots having a temperature higher than or equal to the first reference on the physical server or an average temperature of the physical servers increases.

In addition, the objective function may further include at least one of a second objective function that is a function related to an operating time of the physical server during the first predetermined period, a third objective function that is a function related to an amount of change in the load of the physical server calculated by the initial predicted virtual load during the first predetermined period, and a fourth objective function that is a function related to a difference between loads of the physical servers calculated by the initial predicted virtual load during the first predetermined period.

In addition, the schedule module may calculate the placement schedule by the predetermined placement schedule calculation method considering a constraint condition, and the constraint condition may include a first condition for excluding the placement of the virtual machine at a spot having a temperature higher than or equal to a second reference on the physical server.

In addition, the virtual machine placement system may further include: a temperature sensing module that measures the temperature of the physical server; and a monitoring module that determines an abnormality based on a measured temperature that is the temperature of the physical server measured by the temperature sensing module and a predicted temperature that is the temperature of the physical server predicted by the temperature prediction module, wherein, when a first monitoring condition is satisfied, the monitoring module may determine that the temperature sensing module has failed, and the first monitoring condition may be a condition that the measured temperature and the predicted temperature differ from each other by a predetermined temperature or higher.

In addition, when a second monitoring condition is satisfied even if the first monitoring condition is satisfied, the monitoring module may not determine that the temperature sensing module has failed, and may determine that the physical server operates abnormally.

In addition, the temperature sensing module may include a temperature sensor disposed in the physical server, and a temperature calculation unit that calculates a temperature based on information provided from the temperature sensor, and the second monitoring condition may be a condition that a proportion of temperature sensors determined as having failed among temperature sensors disposed in one physical server is greater than or equal to a predetermined reference.

In addition, when the monitoring module determines that the physical server operates abnormally, the migration module may migrate the virtual machine placed in the corresponding physical server to another physical server.

In addition, according to an embodiment of the present invention, there is provided a virtual machine placement method, implemented by a virtual machine placement system, for placing a plurality of virtual machines on a first physical server and a second physical server in order to efficiently operate a physical server in which the plurality of virtual machines are installed, the physical server including the first physical server and the second physical server, the virtual machine placement method including: calculating a virtual machine workload that is a load imposed on the physical server by implementing the virtual machine by using a predetermined workload calculation method based on information related to operations of the first physical server and the second physical server; calculating an initial predicted virtual load that is a load expected to be imposed on the physical server by the virtual machine during a first predetermined period based on the virtual machine workload; predicting a temperature of the physical server during the first predetermined period based on the initial predicted virtual load; calculating a placement schedule that is a schedule in which the plurality of virtual machines are placed on the first physical server and the second physical server by a predetermined placement schedule calculation method; and migrating the plurality of virtual machines so that the plurality of virtual machines are placed on the first physical server and the second physical server according to the placement schedule, wherein the placement schedule is calculated considering the predicted temperature of the physical server.

In addition, the predetermined placement schedule calculation method may be a method of calculating the placement schedule when the value of an objective function is minimized based on the initial predicted virtual load, and the objective function may include a first objective function that is a function considering the temperature of the physical server.

In addition, the first objective function may be a function considering the number of spots having a temperature higher than or equal to a first reference on the physical server during the first predetermined period.

BRIEF DESCRIPTION OF DRAWINGS

FIG. 8A, FIG. 8B, and FIG. 8C are a diagram for describing the temperature monitoring step in the virtual machine placement method according to an embodiment of the present invention.

FIG. 9 is a table for describing performance conditions in the virtual machine placement method according to an embodiment of the present invention.

DETAILED DESCRIPTION

Figure 1:
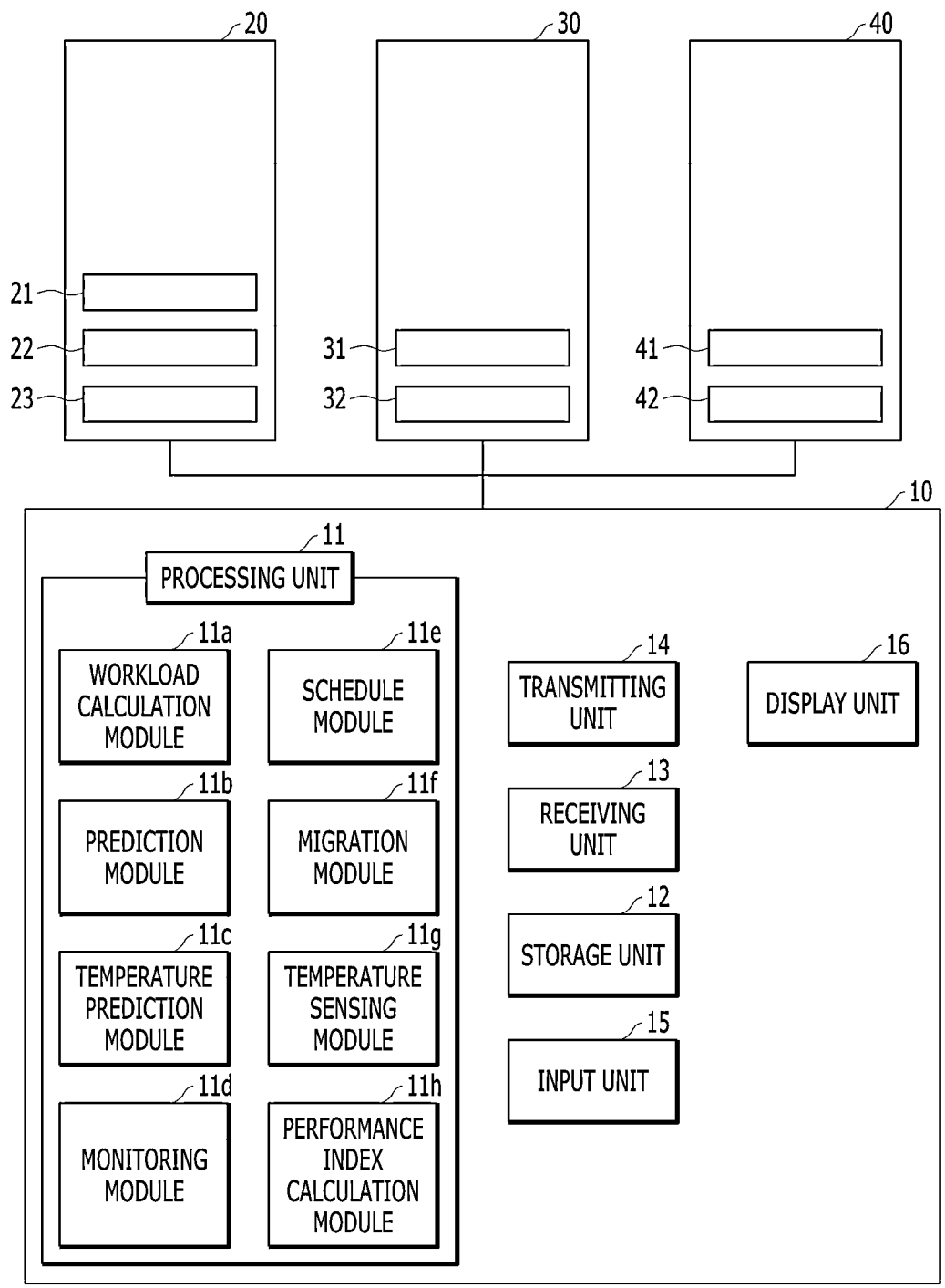
FIG. 1 is a block diagram of a virtual machine placement system according to an embodiment of the present invention.

Hereinafter, specific embodiments of the present disclosure will be described in detail with reference to the drawings. However, the spirit of the present invention is not limited to the presented embodiments, and those of ordinary skill in the art who understand the spirit of the present invention can easily suggest other degenerative inventions or other embodiments falling within the scope of the present invention through addition, change, deletion, and the like of other elements within the scope of the same spirit. However, this will also be said to fall within the scope of the present invention.

In addition, elements having the same functions within the scope of the same idea shown in the drawings of each embodiment are denoted by the same reference numerals.

When the detailed description of the relevant known configurations or functions is determined to unnecessarily obscure the gist of the present invention, the detailed description thereof will be omitted.

FIG. 1 is a block diagram of a virtual machine placement system according to an embodiment of the present invention.

Referring to FIG. 1, the virtual machine placement system according to the embodiment of the present invention may include a processing unit 11 that processes information (e.g., data) necessary for placing and aligning virtual machines, a storage unit 12 that stores the information necessary for placing and aligning the virtual machines, a receiving unit 13 that receives the information necessary for placing and aligning the virtual machines, and a transmitting unit 14 that transmits the information necessary for placing and aligning the virtual machines.

In addition, the virtual machine placement system may further include an input unit 15 that transmits information generated by external input to the receiving unit 13, and a display unit 16 that is a medium for displaying a placement schedule to be described below and delivering the placement schedule to a user.

The virtual machine placement system may refer to a device capable of processing information processing operations as a type of computing device.

Examples of the computing device may include a desktop computer, a notebook computer, a smartphone, a personal digital assistant (PDA), a portable multimedia player (PMP), a mobile terminal including a portable terminal, and/or a smart TV.

However, the present invention is not limited thereto, and the type of the virtual machine placement system may be variously modified at a level obvious to those of ordinary skill in the art.

The storage unit 12 may store information (data) necessary for implementing the virtual machine placement method.

A program for performing the virtual machine placement method may be stored in the storage unit 12.

For example, the storage unit 12 may include an internal memory and/or an external memory.

For example, the internal memory may include at least one of volatile memory (e.g., DRAM, SRAM, or SDRAM), non-volatile memory (e.g., one time programmable ROM (OTPROM), PROM, EPROM, EEPROM, mask ROM, or flash ROM), flash memory, hard drive, and solid state drive (SSD).

The external memory may include flash drive, for example, compact flash (CF), secure digital (SD), micro-SD, mini-SD, extreme digital (xD), multi-media card (MMC), or memory stick.

However, the present invention is not limited thereto, and the storage unit 12 may include any elements capable of storing the information necessary for implementing the virtual machine placement method.

For example, the storage unit 12 may be a database.

The receiving unit 13 may receive information transmitted from a physical server.

The receiving unit 13 may receive information related to the operation of the physical server from the corresponding physical server.

The transmitting unit 14 may transmit information to the physical server.

The transmitting unit 14 may transmit a control signal calculated by the processing unit 11 to the physical server.

The virtual machine placement system may transmit the control signal to each physical server so that a virtual machine running on one physical server is migrated to another physical server.

For example, the input unit 15 may be a keyboard.

However, the present invention is not limited thereto, and the type of the input unit 15 may be variously modified at a level obvious to those of ordinary skill in the art.

For example, the display unit 16 may be a display.

However, the present invention is not limited thereto, and the type of the display unit 16 may be variously modified at a level obvious to those of ordinary skill in the art.

The elements in the virtual machine placement system may be connected to each other in a wired and/or wireless manner.

The virtual machine placement system may be connected to each physical server in a wired and/or wireless manner.

The processing unit 11 may perform an operation such as any information processing necessary for implementing the virtual machine placement method, based on the information stored in the storage unit 12.

For example, the processing unit 11 may refer to a central processing unit (CPU).

However, the present invention is not limited thereto, and the processing unit 11 may include any devices or components capable of performing an operation necessary for implementing the virtual machine placement method.

The processing unit 11 may include a workload calculation module 11*a*, a prediction module 11*b*, a temperature prediction module 11*c*, a monitoring module 11*d*, a schedule module 11*e*, a migration module 11*f*, and a temperature sensing module 11*g*.

The physical server may refer to a hardware platform on which the virtual machine can be executed.

The server as used herein may include other elements for performing a server environment.

The server may include any type of device.

For example, the server may be a digital device including a processor mounted thereon and having computing capability, such as a laptop computer, a notebook computer, a desktop computer, a web pad, or a mobile phone.

For example, the server may be a web server. However, the present invention is not limited thereto, and the type of the server may be variously modified at a level obvious to those of ordinary skill in the art.

However, the present invention is not limited thereto, and the physical server may be a concept including any means on which the virtual machine can be executed.

The virtual machine placement system according to the embodiment of the present invention is described based on controlling and managing a first physical server 20, a second physical server 30, and a third physical server 40, but the present invention is not limited thereto. The number of physical servers managed and controlled by the virtual machine placement system may be variously modified at a level obvious to those of ordinary skill in the art.

For example, as illustrated in FIG. 1, the physical server may include the first physical server 20, the second physical server 30, and the third physical server 40. An a-th virtual machine 21, a b-th virtual machine 22, and a c-th virtual machine 23 may be driven on the first physical server 20. A d-th virtual machine 31 and an e-th virtual machine 32 may be driven on the second physical server 30. An f-th virtual machine 41 and a g-th virtual machine 42 may be driven on the third physical server 40.

Hereinafter, a virtual machine placement method implemented by the virtual machine placement system will be described in detail.

Figure 2:
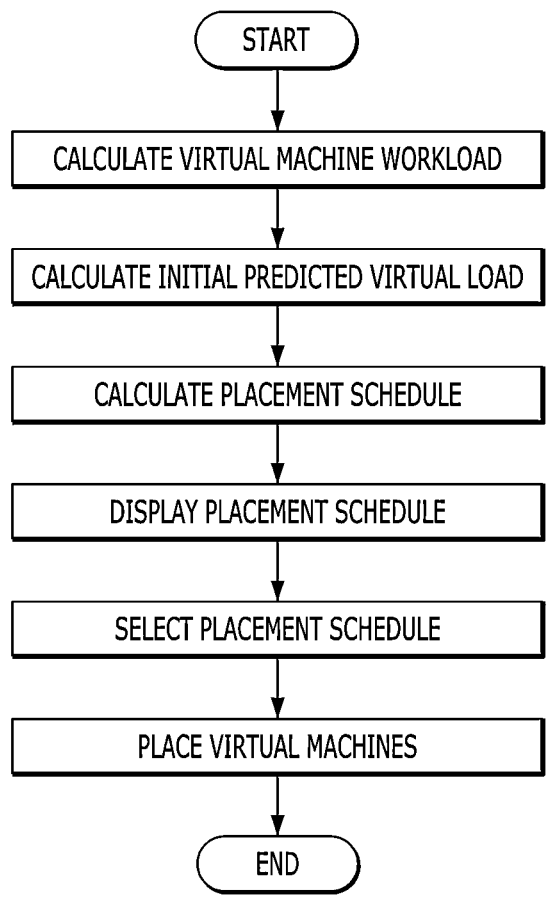
FIG. 2 is a flowchart of a virtual machine placement method implemented by a virtual machine placement system according to an embodiment of the present invention.
Figure 3:
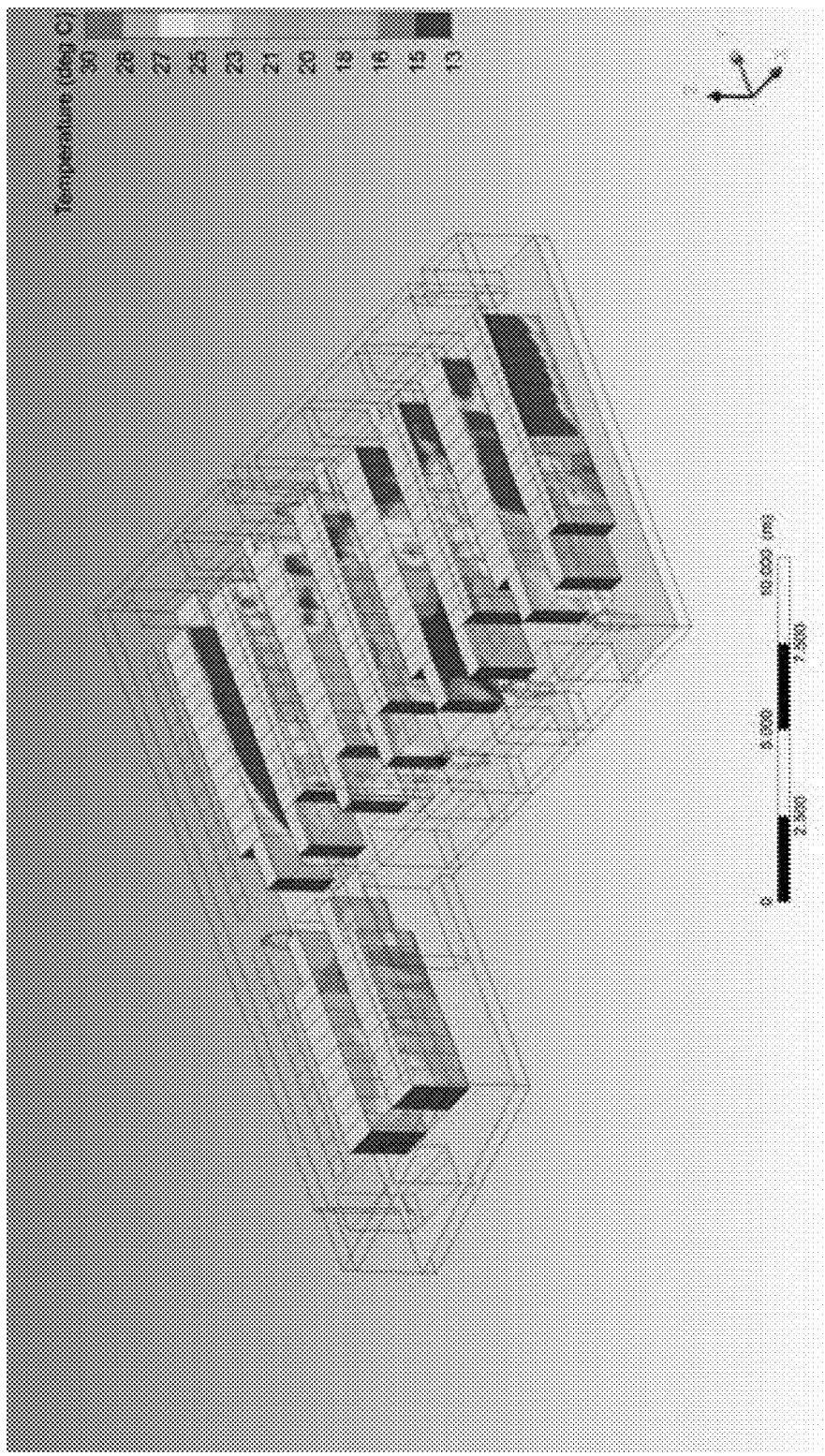
FIG. 3 is a diagram for describing a first objective function in the virtual machine placement method according to an embodiment of the present invention.

FIG. 2 is a flowchart of the virtual machine placement method implemented by the virtual machine placement system according to an embodiment of the present invention, FIG. 3 is a diagram for describing a first objective function in the virtual machine placement method according to an embodiment of the present invention, FIG. 4 is a diagram for describing a third objective function in the virtual machine placement method according to an embodiment of the present invention, and FIG. 5 is a diagram for describing a fourth objective function in the virtual machine placement method according to an embodiment of the present invention.

Referring to FIGS. 2 to 5, the virtual machine placement method, implemented by the virtual machine placement system, for placing a plurality of virtual machines on a first physical server and a second physical server in order to efficiently operate a physical server in which the plurality of virtual machines are installed, the physical server including the first physical server and the second physical server, may include: calculating a virtual machine workload that is a load imposed on the physical server by implementing the virtual machine through a predetermined workload calculation method based on information related to operations of the first physical server and the second physical server; calculating an initial predicted virtual load that is a load predicted to be imposed on the physical server by the virtual machine during a first predetermined period based on the virtual machine workload; predicting a temperature of the physical server during the first predetermined period based on the initial predicted virtual load; calculating a placement schedule that is a schedule for placing the virtual machines on the first physical server and the second physical server by a predetermined placement schedule calculation method; and migrating the virtual machines so that the virtual machines are placed on the first physical server and the second physical server according to the placement schedule.

In addition, the virtual machine placement method may further include determining an abnormality based on a measured temperature that is the temperature of the physical server measured by the temperature sensing module and a predicted temperature that is the temperature of the physical server predicted by the temperature prediction module.

In addition, the virtual machine placement method may further include displaying, on the display unit, a plurality of placement schedules calculated by the predetermined placement schedule calculation method.

In addition, the virtual machine placement method may further include transmitting a selected placement schedule to the processing unit.

If there are a plurality of calculated placement schedules, one placement schedule may be selected, and if there is one calculated placement schedule, the calculated placement schedule may be the selected placement schedule.

In addition, the virtual machine placement method may further include, when the virtual machine is placed on the first physical server and the second physical server according to the selected placement schedule, comparing the selected predicted virtual load, which is the predicted load of the physical server, with the actual virtual workload, which is the actual load generated while the virtual machine operates on the physical server, according to a predetermined checking method, and determining whether the selected predicted virtual load is normally calculated.

The storage unit may store information related to the operation of the first physical server, information related to the operation of the second physical server, and information related to the operation of the third physical server.

For example, the information related to the operations of the first physical server, the second physical server, and the third physical server may be stored in the storage unit in time series.

To this end, the receiving unit may receive the information related to each operation from the first physical server, the second physical server, and the third physical server.

For example, the information related to the operation may be information related to the operating rates of the elements of the physical server.

The workload calculation module may calculate the virtual machine workload that is the load imposed on the physical server by implementing the virtual machine by using the predetermined workload calculation method.

When the virtual machine is driven on the physical server, the virtual machine workload may refer to a load of resources of the corresponding physical server.

When the virtual machine is driven on the physical server, the virtual machine workload may refer to the load applied to the physical server.

For example, the virtual machine workload may be calculated as a load imposed on the CPU of the physical server by the operation of the virtual machine on the physical server.

Therefore, the predetermined workload calculation method may include a method of calculating the virtual machine workload as the load imposed on the CPU of the physical server.

In other words, the predetermined workload calculation method may calculate virtual machine workload information based on only the operation degree of the CPU.

In the predetermined workload calculation method, it may be assumed that one virtual machine can be executed only on one physical server.

For example, this may mean that one virtual machine cannot be implemented on two physical servers.

The load applied to one physical server may be the sum of virtual machine workloads generated by virtual machines placed on one physical server.

This simplifies basic data required for prediction, which will be described below, thereby further increasing the accuracy of prediction in a step described below.

The prediction module may calculate the initial predicted virtual load that is the load expected to be imposed on the physical server by the virtual machine during a first predetermined period based on the virtual machine workload.

For example, a reference time point may be a time point at which the virtual machine workload is calculated.

However, the present invention is not limited thereto, and the reference time point may be variously modified at a level obvious to those of ordinary skill in the art.

In order to calculate the initial predicted virtual load, the virtual machine workload that is the workload of each of the virtual machines during the first predetermined period may be predicted.

The reason for predicting the workload of the virtual machine during the first predetermined period and re-placing the virtual machines based on the predicted workload is that, when migration is performed based on overload at a specific time point, it is impossible to increase the number of migrations and to implement the overall stabilization of the physical server.

Therefore, the above-described problem may be effectively solved by placing the virtual machine on the physical server based on a specific period rather than a specific time point in the future.

For example, the first predetermined period may be three months.

However, the present invention is not limited thereto, and the first predetermined period may be variously modified at a level obvious to those of ordinary skill in the art.

For example, the prediction module may calculate virtual machine workload information during the first predetermined period by using an algorithm such as multiple regression model, ARIMA analysis, or deep learning based on the virtual machine workload stored in the storage unit.

To this end, the prediction module may store a prediction model capable of calculating the initial predicted virtual load, and the prediction model may be calculated through machine learning or deep learning based on the placement schedule of the virtual machine placed on the physical server and the past virtual machine workloads corresponding thereto.

The prediction module may predict the load of the physical server during the first predetermined period based on the calculated virtual machine workload during the first predetermined period.

This is a technology that is obvious to those of ordinary skill in the art, and a detailed description thereof may be omitted.

For example, the initial predicted virtual load may refer to the workload of the virtual machine predicted during the first predetermined period from a virtual machine workload calculation time point or during the first predetermined period from an arbitrary time point.

The temperature prediction module may predict the temperature of the physical server during the first predetermined period based on the initial predicted virtual load.

Specifically, the temperature sensing module is a module for measuring the temperature of the physical server. The temperature sensing module may include a temperature sensor disposed in the physical server, and a temperature calculation unit that calculates a temperature based on information provided from the temperature sensor.

The temperature sensor may be disposed inside the physical server or attached to the outer surface of the physical server to measure the temperature generated in the physical server.

A plurality of temperature sensors may be disposed in each physical server, and a plurality of temperature sensors may be disposed in one physical server.

The temperature calculation unit may calculate the temperature of the physical server based on measurement information provided from the temperature sensor. (See FIG. 3).

The temperature prediction module may calculate a temperature prediction model that predicts the temperature of the physical server through machine learning or deep learning based on the load of the physical server generated by the virtual machine and the temperature values of the physical server at the same time.

When the initial predicted virtual load is input to the temperature prediction model, the temperature of the physical server during the first predetermined period may be predicted.

The schedule module may calculate the placement schedule considering the predicted temperature of the physical server.

The schedule module may calculate the placement schedule that is a schedule in which the virtual machines are placed on the first physical server and the second physical server by the predetermined placement schedule calculation method.

The schedule module may calculate the placement schedule by using the initial predicted virtual load and the predicted temperature of the physical server. If necessary, the prediction module and the temperature prediction module may calculate the prediction again together with the schedule module.

The predetermined placement schedule calculation method may be a method of calculating the placement schedule when the value of an objective function is minimized based on the initial predicted virtual load.

The objective function may include "first weight * first objective function+second weight * second objective function+third weight * third objective function+fourth weight+ fourth objective function".

The schedule module may calculate the placement schedule by the predetermined placement schedule calculation method considering a constraint condition.

The constraint condition may include a first condition for excluding the placement of the virtual machine at a spot having a temperature higher than or equal to a second reference on the physical server.

For example, the second reference may be 40°.

However, the present invention is not limited thereto, and the second reference may be variously modified at a level obvious to those of ordinary skill in the art.

One physical server as used herein refers to a server rack unit in which a plurality of individual servers are placed, and the spot may refer to one individual server.

The temperature sensor may be disposed for each individual server.

The first condition may be for placing no virtual machine on a server having a temperature higher than or equal to a predetermined temperature.

The constraint condition may further include a second condition for calculating the placement schedule of the virtual machine so that the load of the physical server is imposed on an arbitrary physical server only within a predetermined range.

For example, in the predetermined range, the operating rate of the physical server (the degree to which the load is imposed) may be 10% to 80%.

However, the present invention is not limited thereto, and the predetermined range may be variously modified at a level obvious to those of ordinary skill in the art.

The constraint condition may further include a third condition for preventing the physical server from starting again for a predetermined time when the non-operating physical server is being operated due to the migration of the virtual machine.

The constraint condition may further include a fourth condition for allowing the migration of the virtual machine during the first predetermined period.

The constraint condition may further include a fifth condition in which the number of allowed migrations for one virtual machine during the first predetermined period is less than or equal to a predetermined reference.

The constraint condition may further include a sixth condition assuming that the specifications of the physical servers are the same (homogeneous condition).

The physical server on which the virtual machine is not placed may be turned off.

The amount of power of the server is proportional to the CPU usage rate. When the server is off, the amount of power may be 0.

The predetermined placement calculation method may include a method of, when it is predicted that the load of the physical server will be greater than or equal to the first reference X10 (see FIGS. 3 and 4), migrating at least one of the virtual machines placed on the arbitrary physical server to another physical server, so that the load of the physical server is imposed on the arbitrary physical server only within a predetermined range (Condition 2-1).

For example, the first reference X10 (see FIGS. 4 and 5) may mean that the operating rate of the physical server (the degree to which the load is imposed) is 80%.

As a solution to prevent the load of the physical server from exceeding the first reference, the schedule module may calculate the placement schedule by using a method of migrating at least one virtual machine placed on the target physical server to another physical server based on a time point at which the workload of the target physical server is predicted to exceed the first reference.

Due to this, it is possible to effectively prevent the workload (operating rate) of the physical server from being excessively applied beyond the first reference.

However, the present invention is not limited thereto, and the first reference may be variously modified at a level obvious to those of ordinary skill in the art.

In addition, the predetermined placement calculation method may include a method of, when it is predicted that the load of the physical server will be less than or equal to the second reference X20 (see FIGS. 4 and 5), migrating all the virtual machines placed on the arbitrary physical server to another physical server, so that the load of the physical server is imposed on the arbitrary physical server only within a predetermined range (Condition 2-2).

For example, the second reference X20 (see FIGS. 3 and 4) may mean that the operating rate of the physical server (the degree to which the load is imposed) is 10%.

As a solution to prevent the load of the physical server from falling below the second reference, the schedule module may calculate the placement schedule by using a method of migrating all the virtual machines placed on the target physical server to another physical server based on a time point at which the workload of the target physical server is predicted to fall below the second reference.

This may mean a start condition of a condition in which the physical server is not operated.

In other words, as a solution to prevent the load of the physical server from falling below the second reference, the processing unit may stop the operation of the target physical server by placing the virtual machine placed on the target physical server to another physical server.

The predetermined placement calculation method may include a method of calculating the placement schedule information so that the operating physical server does not change to a non-operating state due to the migration of the virtual machine that causes the non-operating physical server to operate. (Condition 3)

When stopping one physical server and starting the operation of another physical server at the same time, there is no benefit to stopping the physical server and there is a problem in that more power and time are required to start the server.

Therefore, such a problem may be solved through the third condition.

This will be described below in detail.

In addition, when the placement schedule is calculated by the predetermined placement calculation method, the placement schedule may be calculated so that the migration of the virtual machine between physical servers is allowed during the first predetermined period. (Condition 4)

However, since data loss may be caused when the virtual machine is migrated frequently, the migration of one virtual machine during the first predetermined period may be limited to a predetermined number of times. (Condition 5)

For example, the predetermined number of times may be twice.

However, the present invention is not limited thereto, and the predetermined number of times may be variously modified at a level obvious to those of ordinary skill in the art.

In addition, when the placement schedule is calculated by the predetermined placement calculation method, the placement schedule may be calculated on the assumption that the specifications of the respective physical servers are the same (homogeneous condition). (Condition 6)

The objective function may include a first objective function, a second objective function, a third objective function, and a fourth objective function.

The schedule module may calculate one to four placement schedules in which the objective function value is minimum.

Hereinafter, the predetermined placement schedule calculation method will be described in detail.

The objective function may include the first objective function that is a function considering the temperature of the physical server.

The first objective function may be a function considering the number of spots having a temperature higher than or equal to the first reference on the physical server during the first predetermined period.

The first reference may be 40° C.

However, the present invention is not limited thereto, and the first reference may be variously modified at a level obvious to those of ordinary skill in the art.

In addition, the first objective function may be a function considering allowing the temperature of the physical server to be close to a predetermined range during the first predetermined period.

For example, the predetermined range may be 18° C. to 25° C.

However, the present invention is not limited thereto, and the predetermined range may be variously modified at a level obvious to those of ordinary skill in the art.

The objective function may further include the second objective function that is a function related to the operating time of the physical server during the first predetermined period.

That is, the second objective function may be a function related to whether the first physical server is operated during the first predetermined period and whether the second physical server is operated during the first predetermined period.

As the second objective function is smaller, the number of non-operating physical servers and the non-operating time of the physical servers may be maximized.

When the second objective function is minimum, the sum of the non-operating times per one physical server with respect to all the physical servers may be maximized.

The second objective function may be meaningful in minimizing the operating time of the server to thereby minimize power loss due to the operation of the physical server.

The objective function may further include the third objective function that is a function related to the amount of change in the load of the physical server calculated by the initial predicted virtual load during the first predetermined period.

Referring to FIG. 4, the objective function may further include the third objective function that is a function related to the amount of change in the load (workload) of the physical server calculated by the initial predicted virtual load during the first predetermined period.

Figure 4A:
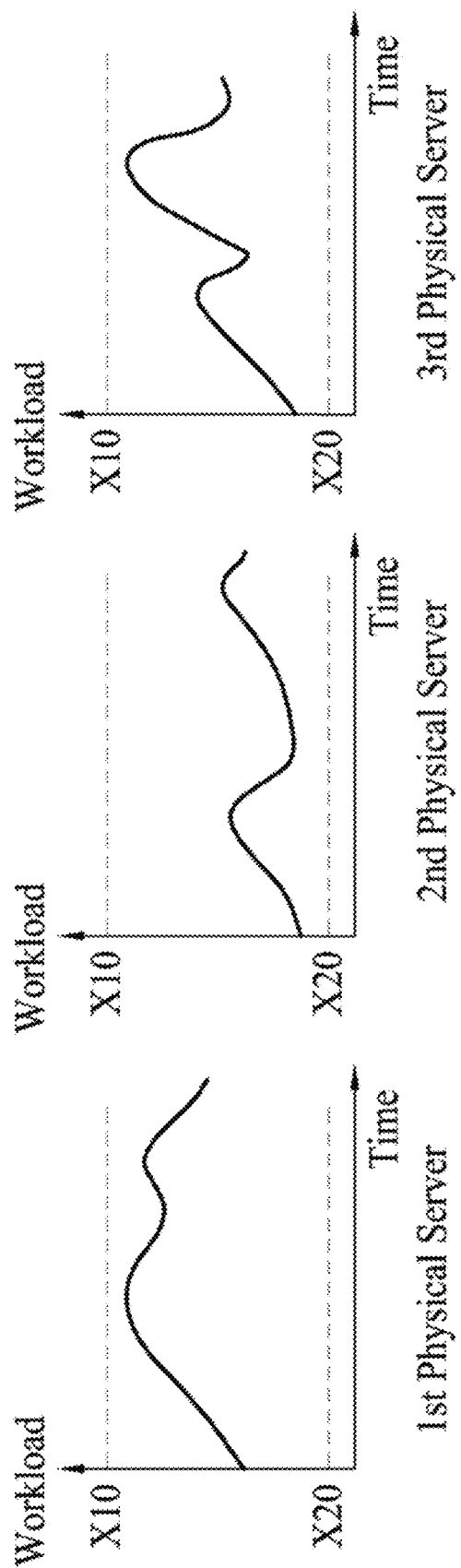
FIG. 4A and FIG. 4B are a diagram for describing a third objective function in the virtual machine placement method according to an embodiment of the present invention.

For example, FIG. 4A is a graph showing the workloads of the first to third physical servers when the virtual machines are placed on the first to third physical servers according to a first schedule.

Figure 4B:
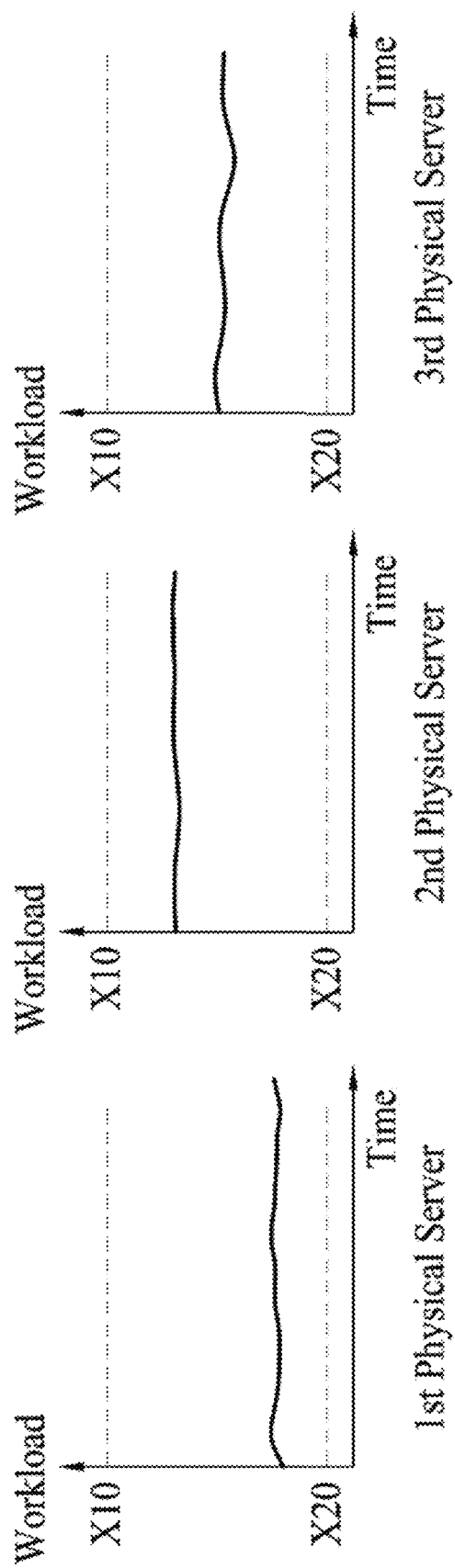

In addition, FIG. 4B is a graph showing the workloads of the first to third physical servers when the virtual machines are placed on the first to third physical servers according to a second schedule.

It is confirmed from the above description that the workload of each physical server may be calculated as the sum of the workloads of the virtual machines installed in each physical server.

Referring to FIG. 4A, when the virtual machines are placed on the physical servers according to the first schedule, the workloads of all the physical servers may be less than the first reference X10 or greater than the second reference X20.

In addition, referring to FIG. 4B, when the virtual machines are placed on the physical servers according to the second schedule, the workloads of all the physical servers may be less than the first reference X10 or greater than the second reference X20.

However, when the virtual machines are placed on the physical servers based on the second schedule, the amount of change (slope) in the workload of each physical server may be smaller than when the virtual machines are placed on the physical servers based on the first schedule.

As the placement schedule of the virtual machines on the physical servers, the second schedule is more preferable than the first schedule.

In addition, the value of the first objective function from which the second schedule is derived may be smaller than the value of the first objective function from which the first schedule is derived.

When the rate of change in the workload of the physical server is large, the workload of the physical server exceeds an arbitrary reference only for a short time, and thus the virtual machine can be migrated.

In this case, since frequent migration of the virtual machine may occur, the risk of data loss of the virtual machine may further increase.

The third objective function may be a function for preventing the above problem.

The objective function may further include the fourth objective function that is a function related to the difference between the loads of the physical servers calculated by the initial predicted virtual load during the first predetermined period.

Figure 5A:
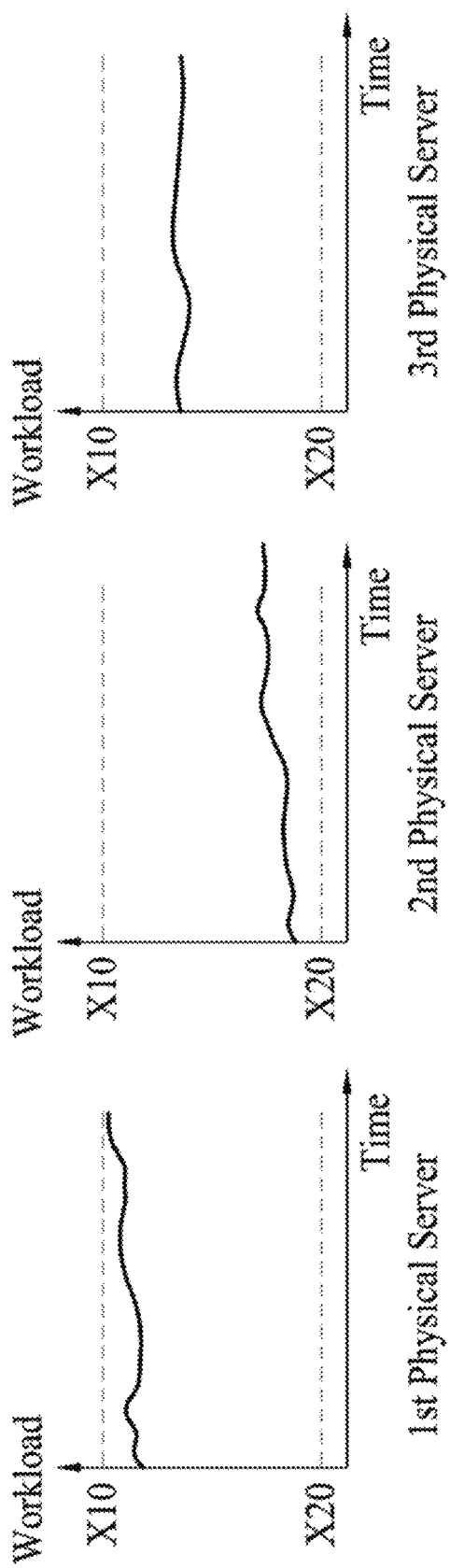
FIG. 5A and FIG. 5B are a diagram for describing a fourth objective function in the virtual machine placement method according to an embodiment of the present invention.

For example, FIG. 5A is a graph showing the workloads of the first to third physical servers when the virtual machines are placed on the first to third physical servers according to a third schedule.

Figure 5B:
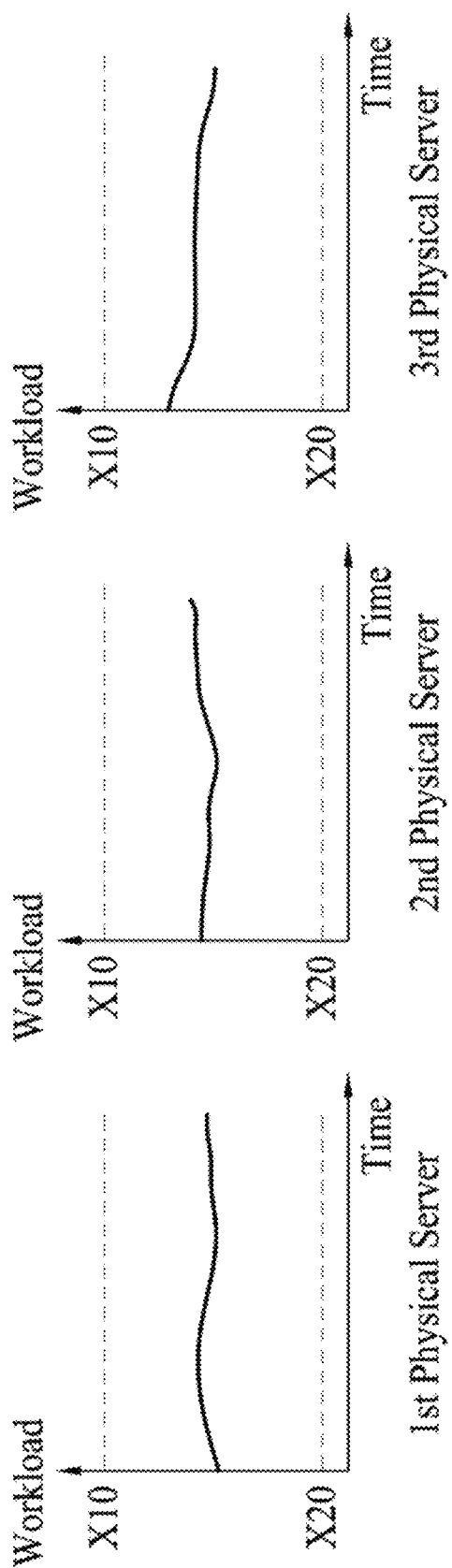

In addition, FIG. 5B is a graph showing the workloads of the first to third physical servers when the virtual machines are placed on the first to third physical servers according to a fourth schedule.

It is confirmed from the above description that the workload of each physical server can be calculated as the sum of the workloads of the virtual machines installed in each physical server.

Referring to FIG. 5A, when the virtual machines are placed on the physical servers according to the third schedule, the workloads of all the physical servers may be less than the first reference X10 or greater than the second reference X20.

In addition, referring to FIG. 5B, when the virtual machines are placed in the physical servers according to the fourth schedule, the workloads of all the physical servers may be less than the first reference X10 or greater than the second reference X20.

However, when the virtual machines are placed on the physical servers based on the fourth schedule, the difference between the workloads of the respective physical servers may be smaller than when the virtual machines are placed on the physical servers based on the third schedule.

As the placement schedule of the virtual machines on the physical servers, the fourth schedule is more preferable than the third schedule.

In addition, the value of the fourth objective function from which the fourth schedule is derived may be smaller than the value of the fourth objective function from which the third schedule is derived.

In order to compare the workloads of the physical servers, the physical servers may be compared with each other by using an average value of the workloads of the physical servers during the first predetermined period.

The meaning of the fourth objective function may be for evenly utilizing the physical servers.

The first to fourth weights may be preset by an installer of the virtual machine placement system and stored in the storage unit.

The schedule module may calculate the placement schedule by setting the weights between the objective functions, and may calculate the placement schedule by increasing the weight of the first objective function as the number of spots having a temperature higher than or equal to the first reference on the physical server or the average temperature of the physical servers increases.

For example, when the number of hot spots on the physical server increases or when the average temperature of the physical servers increases, normal virtual machine migration may not solve the problem of increasing the temperature of the physical servers. Due to this, when the first weight is further increased, the factor regarding the temperature is further considered upon calculation of the placement schedule, and thus the placement schedule with more emphasis on the temperature control of the physical server may be calculated.

The placement schedule may refer to a schedule related to how virtual machines are placed on physical servers so that each objective function is minimized in a state in which the first to sixth conditions are satisfied.

The display unit may display the placement schedules transmitted from the processing unit.

The processing unit may calculate first placement schedule information that is information related to the first placement schedule, second placement schedule information that is information related to the second placement schedule, third placement schedule information that is information related to the third placement schedule, and fourth placement schedule information that is information related to the fourth placement schedule, and may transmit the first placement schedule information, the second placement schedule information, the third placement schedule information, and the fourth placement schedule information to the display unit.

The placement schedule may include a first placement schedule that is the placement of the virtual machines on the physical servers (e.g., the first physical server and the second physical server) in which the value of the second objective function, the value of the third objective function, and the value of the fourth objective function are minimized based on a state in which the value of the first objective function is minimum, a second placement schedule that is the placement of the virtual machines on the physical servers (e.g., the first physical server and the second physical server) in which the value of the first objective function, the value of the third objective function, and the value of the fourth objective function are minimized based on a state in which the value of the second objective function is minimum, a third placement schedule that is the placement of the virtual machines on the physical servers (e.g., the first physical server and the second physical server) in which the value of the first objective function, the value of the second objective function, and the value of the fourth objective function are minimized based on a state in which the value of the third objective function is minimum, and a fourth placement schedule that is the placement of the virtual machines on the physical servers (e.g., the first physical server and the second physical server) in which the value of the first objective function, the value of the second objective function, and the value of the third objective function are minimized based on a state in which the value of the fourth objective function is minimum.

Hereinafter, the predetermined placement schedule calculation method will be described by using one placement schedule as an example.

Figure 6:
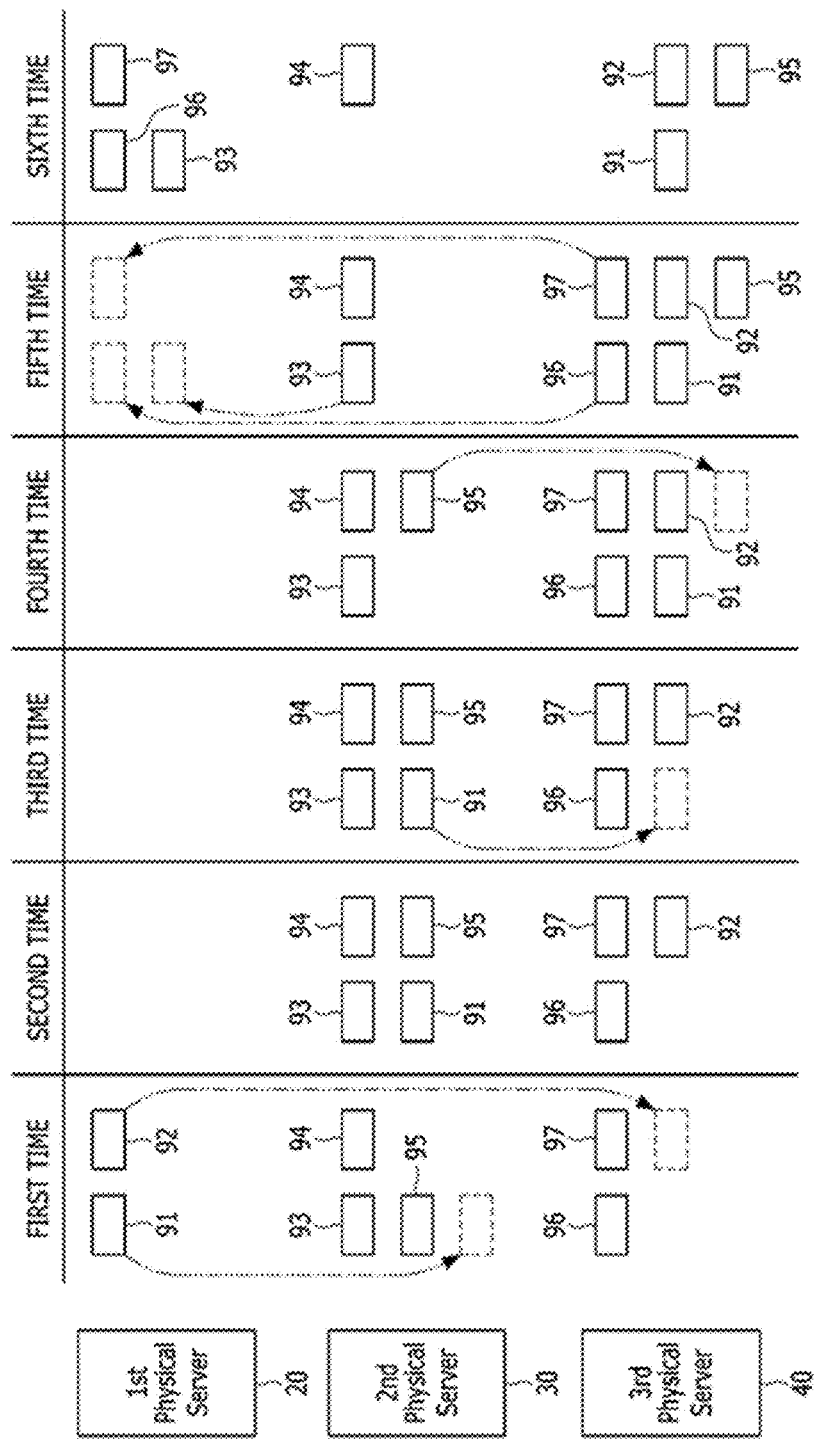
FIG. 6 is a diagram for describing a placement schedule calculating step in the virtual machine placement method according to an embodiment of the present invention.
Figure 7:
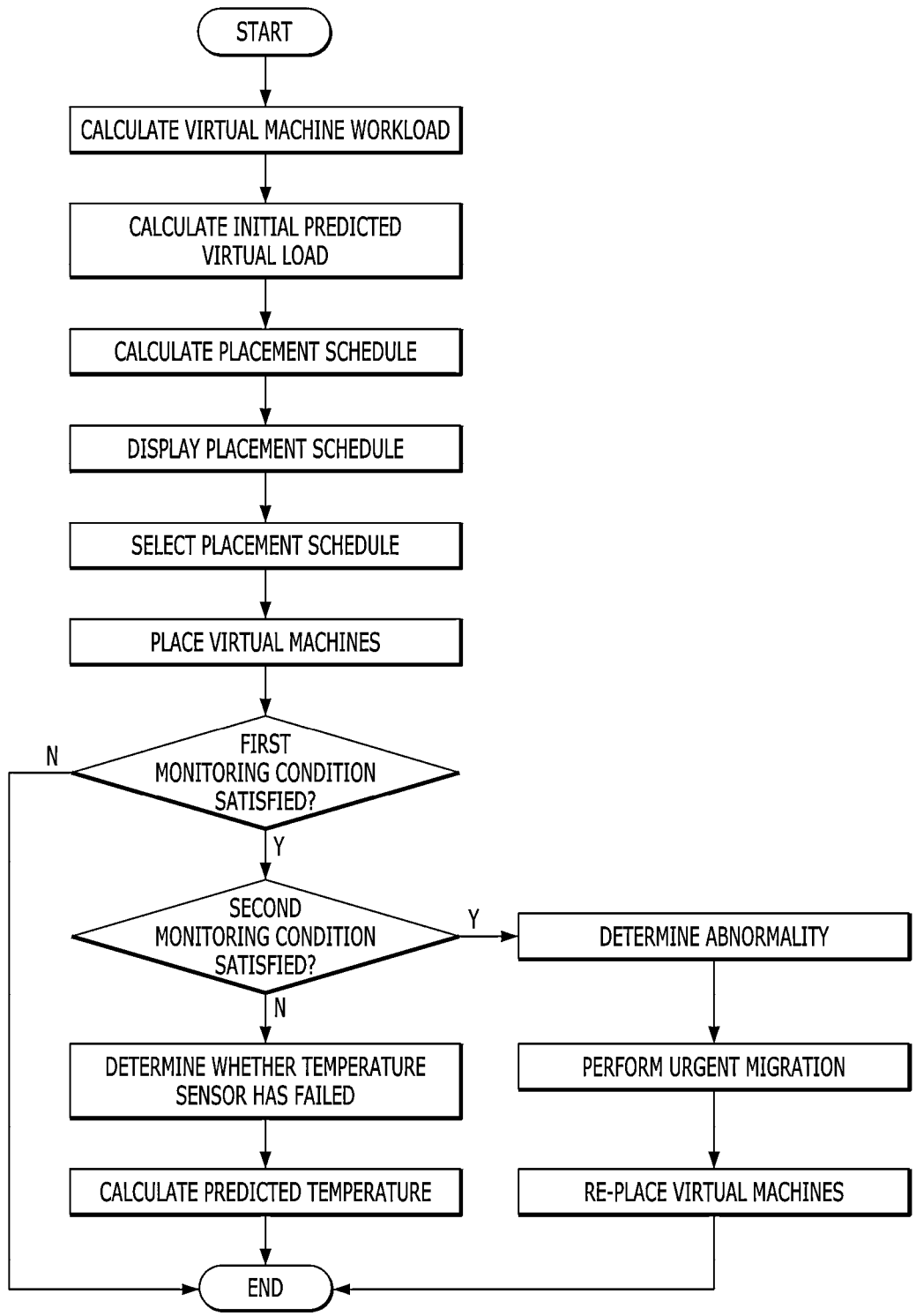
FIG. 7 is a flowchart of a virtual machine placement method, to which a temperature monitoring step is added, according to an embodiment of the present invention.

FIG. 6 is a diagram for describing a placement schedule calculating step in the virtual machine placement method according to an embodiment of the present invention.

FIG. 6 is a diagram schematically illustrating the schedules of the virtual machines placed in the physical servers during a predetermined period in the first predetermined period.

The example illustrated in FIG. 5A and FIG. 5B may relate to the first placement schedule based on the case in which the first objective function is minimized. Hereinafter, it will be described based on this.

However, this is an example and it is obvious that the present invention is not limited thereto.

For example, the physical servers may include a first physical server 20, a second physical server 30, and a third physical server 40, and the virtual machines may include a first virtual machine 91, a second virtual machine 92, a third virtual machine 93, a fourth virtual machine 94, a fifth virtual machine 95, a sixth virtual machine 96, and a seventh virtual machine 97.

For example, in order to minimize another objective function in a state in which the first objective function is minimized, the schedule module may calculate the placement schedule so that, at the zeroth time that is the time before the first time, the first virtual machine 91 and a second virtual machine 92 are placed on the first physical server 20, the third virtual machine 93, the fourth virtual machine 94, and the fifth virtual machine 95 are placed on the second physical server 30, and the sixth virtual machine 96 and the seventh virtual machine 97 are placed on the third physical server 40.

According to the placement of the virtual machines at the zeroth time, it may be predicted that the workload of the first physical server is less than or equal to the second reference at the first time.

This is the case in which condition 2-2 is satisfied, and the placement schedule may be calculated so that the first virtual machine 91 and the second virtual machine 92, which are virtual machines placed on the first physical server 20, are migrated to another physical server.

When the virtual machine is migrated under condition 2-2, it may be determined to which physical server the virtual machine is migrated, based on the case in which the objective function is minimized.

Based on this, the placement schedule may be calculated so that the first virtual machine 91 is migrated to the second physical server 30 and the second virtual machine 92 is migrated to the third physical server 40.

Due to the migration at the first time, the placement schedule may be calculated so that the first physical server 20 is not operated at the second time.

For example, when the third virtual server 93, the fourth virtual server 94, the fifth virtual server 95, and the first virtual server 91 are placed on the second physical server 30, and the second virtual server 92, the sixth virtual server 96, and the seventh virtual server 97 are placed on the third physical server 40, migration may not occur at the second time when it is assumed that another objective function is also minimum in a state in which the first objective function is minimum.

On the other hand, in order to minimize another objective function in a state in which the first objective function is minimum, the placement schedule may be calculated so that the first virtual server 91 placed on the second physical server 30 is migrated to the third physical server 40 at the third time.

In addition, in order to minimize another objective function in a state in which the first objective function is minimum, the placement schedule may be calculated so that the fifth virtual server 95 placed on the second physical server 30 is migrated to the third physical server 40 at the fourth time.

The first physical server 20 may not be operated for the second to fourth times.

Due to the influence of the second objective function, the placement schedule may be calculated so that the first physical server 20 is not operated for the second to fourth times.

According to the placement of the virtual machines at the fourth time, it may be predicted that the workload of the third physical server 40 is greater than or equal to the first reference at the fifth time.

In this case, the placement schedule may be calculated so that at least one of the virtual machines placed in the third physical server 40 is migrated to another physical server at the fifth time (Condition 2-1).

In addition, according to the placement of the virtual machines at the fourth time, it may be predicted that the workload of the second physical server 30 is greater than or equal to the first reference at the fifth time (Condition 2-1).

In this case, the placement schedule may be calculated so that at least one of the virtual machines placed in the second physical server 30 is migrated to another physical server at the fifth time (Condition 2-1).

However, since the first virtual machine 91 placed in the third physical server 40 is migrated at the first time and the third time, the first virtual machine 91 may be excluded from the migration target at the fifth time (Condition 5).

In addition, when both the third virtual machine 93 and the fourth virtual machine 94 placed on the second physical server 30 are migrated to the first physical server 20, the operation of the second physical server 30 may be stopped and the operation of the first physical server 20 may be started.

Since the third condition is not satisfied, only one of the third virtual machine 93 and the fourth virtual machine 94 in the second physical server 30 may be migrated to the first physical server 20.

For example, in order to minimize all the objective functions in a state in which the first objective function is minimized, the third virtual machine 93 may be migrated to the first physical server 20 in the second physical server 30, and the sixth virtual machine 96 and the seventh virtual machine 97 may be migrated to the first physical server 20 in the third physical server 40, so as to satisfy the first to fourth conditions (specifically, conditions 2-2 and 3).

The placement schedule may be calculated so that the minimum value of the objective function is satisfied by the migration at the fifth time and migration does not occur at the sixth time.

The description has been made based on the first placement schedule, but this is only an example. A detailed description of the schedule calculation method based on the second placement schedule, the third placement schedule, and the fourth placement schedule may be omitted if it overlaps the above description.

The display unit may display the first placement schedule, the second placement schedule, the third placement schedule, and the fourth placement schedule.

Since the four objective functions may have four non-dominant solutions as independent functions, the first placement schedule, the second placement schedule, the third placement schedule, and the fourth placement schedule may refer to independent solving methods.

An operator may determine one of the first placement schedule, the second placement schedule, the third placement schedule, and the fourth placement schedule and select and input the determined placement schedule through the input unit.

The input unit may calculate information related to the selected placement schedule and transmit the information to the processing unit.

The migration module may place the virtual machines by migrating the virtual machines on the physical servers based on the selected placement schedule.

In this manner, the resources of the physical servers may be used evenly without being biased toward one physical server.

In addition, the virtual machine placement method according to the embodiment of the present invention may further include, when the virtual machines are placed on the first physical server and the second physical server according to the selected placement schedule, comparing the selected predicted virtual load, which is the predicted load of the physical server, with the actual virtual workload, which is the actual load generated while the virtual machine operates on the physical server, according to a predetermined checking method, and determining whether the selected predicted virtual load is normally calculated.

The selected predicted virtual load may be the same as the initial predicted virtual load described above.

However, the present invention is not limited thereto, and the selected predicted virtual load may not match the initial predicted virtual load information.

In this case, after placing the virtual machines according to the selected placement schedule, the prediction module may predict the workloads of the virtual machines during a predetermined period and calculate the selected predicted virtual load.

When the actual workload of the virtual machine differs from the corresponding selected predicted virtual load by a predetermined value or more, the predetermined checking method may be a method of determining that the selected predicted virtual load is calculated incorrectly.

The monitoring module may perform the predetermined checking method.

When the monitoring module determines that the selected predicted virtual load is calculated incorrectly, the scheduling module may calculate the re-predicted virtual load associated with the predicted load of the physical server generated by the virtual machine during a second predetermined period from a re-determination time point that is a time point at which it is determined that the selected predicted virtual load is calculated incorrectly.

The schedule module may re-calculate the placement schedule by the above-described predetermined placement schedule calculation method based on the re-predicted virtual load information. Based on this, a predetermined operation may be performed so that the virtual machines are re-placed.

A detailed description thereof may be omitted if it overlaps the above description.

The second predetermined period may be the same as or different from the first predetermined period described above.

The virtual machine placement method may be performed repeatedly and continuously.

In order for the virtual machines to be re-placed, an operator may select one of a plurality of placement schedules, and the migration module may re-place the virtual machines based on the selected placement schedule.

A detailed description thereof may be omitted if it overlaps the above description.

The temperature sensing module may detect heat generated by the physical server and constantly monitor abnormality of the physical server.

The temperature sensing module may measure the temperature of the physical server.

The monitoring module may determine abnormality based on the measured temperature that is the temperature of the physical server measured by the temperature sensing module and the predicted temperature that is the temperature of the physical server predicted by the temperature prediction module.

When a first monitoring condition is satisfied, the monitoring module may determine that the temperature sensing module has failed.

However, when the first monitoring condition is satisfied, the monitoring module may not determine that the temperature sensing module, specifically, the temperature sensor has failed, but may determine that the physical server operates abnormally.

The first monitoring condition may be a condition that the measured temperature and the predicted temperature differ from each other by a predetermined temperature or higher.

For example, the predetermined temperature may be 4° C.

However, the present invention is not limited thereto, and the predetermined temperature may be variously modified at a level obvious to those of ordinary skill in the art.

The second monitoring condition may be a condition that a proportion of temperature sensors determined as having failed among the temperature sensors disposed in one physical server is greater than or equal to a predetermined reference.

For example, the predetermined reference may be 80%.

However, the present invention is not limited thereto, and the predetermined reference may be variously modified at a level obvious to those of ordinary skill in the art.

Figure 8A:
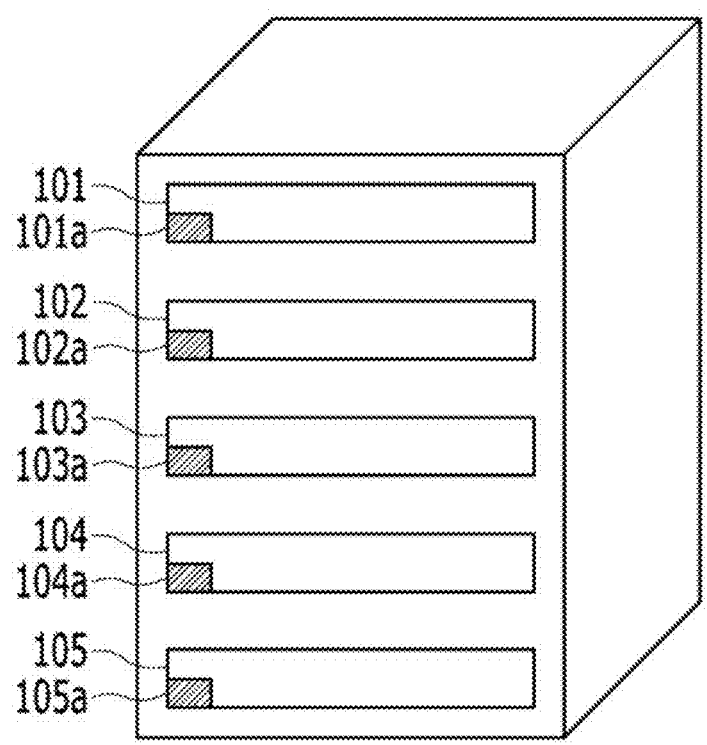

Referring to FIG. 8A, as an example, five individual servers may be placed in one physical server, and a temperature sensor may be placed in each individual server. Each individual server may be referred to as a first individual server 101, a second individual server 102, a third individual server 103, a fourth individual server 104, and a fifth individual server 105, and the temperature sensor placed in each individual server may be referred to as a first temperature sensor 101a, a second temperature sensor 102a, a third temperature sensor 103a, a fourth temperature sensor 104a, and a fifth temperature sensor 105a.

It may be assumed that the temperature of each individual server predicted by the temperature prediction module and the temperature actually sensed by each temperature sensor are the same as shown in FIG. 8B.

In this case, when the first monitoring condition is satisfied but the second monitoring condition is not satisfied, the monitoring module may determine that the third temperature sensor has failed.

When the monitoring module determines that the temperature sensor has failed, the monitoring module may replace the temperature value sensed by the failed temperature sensor with an average of the temperature values sensed by other adjacent normal temperature sensors.

In the case of FIG. 8B, when the monitoring module determines that the third temperature sensor has failed, the temperature prediction module may replace the temperature value of the third temperature sensor used with an average of the temperature values sensed by the second temperature sensor and the fourth temperature sensor.

On the other hand, in the case of FIG. 8C, when both the first monitoring condition and the second monitoring condition are satisfied, the monitoring module may not determine that the temperature sensor has failed, but may determine that one physical server operates abnormally.

When the monitoring module determines that the physical server operates abnormally, the migration module may migrate the virtual machine placed in the corresponding physical server to another physical server.

Another physical server may refer to a physical server that is not determined by the monitoring module as operating abnormally.

The migration may be performed differently according to the state of the virtual machine.

As a specific example, in the case of the virtual machine in which the number of migrations during the first predetermined period is greater than or equal to a predetermined reference, the same virtual machine may be backed up to a normal operating physical server without migrating the virtual machine.

This is because there is a risk of data loss when migration occurs frequently.

On the other hand, in the case of the virtual machine in which the number of migrations during the first predetermined period is less than the predetermined reference, the virtual machine may be backed up to a normal operating physical server.

Here, The physical server to be migrated may be a physical server with the lowest applied load among the currently operating physical servers.

Since this is an urgent virtual machine migration and backup, the virtual machine may be preferentially migrated to an affordable physical server.

After the urgent virtual machine migration, the virtual machine placement system may restart the above-described processes so as to recalculate the placement schedule. A detailed description thereof may be omitted if it overlaps the above description.

When the first monitoring condition or the second monitoring condition is satisfied, the virtual machine placement system may display each situation on the display unit, or may notify a manager's terminal of each situation through the transmitting unit.

The processing unit may further include a performance index calculation module 11h that calculates a performance index that is the performance of the physical server.

The performance index calculation module 11h may calculate the performance of the physical server, and the performance of the physical server may be considered in the virtual machine placement schedule.

FIG. 9 is a table for describing performance conditions in the virtual machine placement method according to an embodiment of the present invention.

Referring to FIG. 9, the performance index calculation module may calculate the performance index considering at least one of a first performance degradation value related to performance degradation of the physical server according to the operating time, a second performance degradation value related to performance degradation of the physical server according to on/off of the physical server, and a third performance degradation value related to performance degradation of the physical server according to the temperature of the physical server.

The operating time after the physical server is installed may be stored in the storage unit.

As the physical server is operated, the performance of the physical server may be degraded.

For example, the performance of the server may be degraded by an average of 14% per year.

For example, the degradation performance of the physical server may have a linear relationship with the operating time of the physical server.

However, the present invention is not limited thereto, and the relationship between the operating time of the physical server and the performance degradation of the physical server may be variously modified at a level obvious to those of ordinary skill in the art.

The first performance degradation value may be a value or a variable indicating the performance degradation of the physical server based on the total operating time of the physical server.

When the physical server is turned on or off, a disk of the physical server may wear out.

That is, frequent on/off of the server may affect disk wear and degrade the performance of the physical server.

The second performance degradation value may be a value or a variable indicating the performance degradation of the physical server based on the number of times the physical server in an off state is turned on or the physical server in an on state is turned off.

For a specific formula, FIG. 9 may be referenced.

The degree of performance degradation of the physical server may increase as the temperature of the physical server increases.

For example, since the temperature of the server has a linear relationship with the CPU usage rate, the degree of performance degradation of the physical server may be calculated through the CPU usage rate.

The third performance degradation value may be a value or a variable indicating the performance degradation of the physical server based on temperatures of the physical server while the physical server is operating.

Specifically, when it is assumed that the physical server when used for the first time is 0, the performance index may be calculated as a value between 0 and 1. The performance index is the sum of the change value of the first performance degradation value, the change value of the second performance degradation value, and the change value of the third performance degradation value based on '1', and the final performance index of the physical server may be calculated by calculating how much the performance of the physical server is degraded.

However, the present invention is not limited thereto, and a specific method of calculating the performance index may be variously modified at a level obvious to those of ordinary skill in the art.

The schedule module may calculate the placement schedule satisfying the constraint condition by the predetermined placement schedule calculation method that is the method of calculating the placement schedule when the objective function value is minimized based on the initial predicted virtual load.

The constraint condition may further include a performance condition considering the performance of the physical server.

The performance condition may be a condition excluding the placement of the virtual machine in the physical server having a performance index less than or equal to a predetermined performance index.

For example, the predetermined performance index may be 0.2.

However, the present invention is not limited thereto, and the predetermined performance index value may be variously modified at a level obvious to those of ordinary skill in the art.

When the performance of the physical server is excessively degraded, the operation of the virtual machine may also be affected. Therefore, it may be preferable not to place the virtual machine on the physical server having excessively degraded performance.

The schedule module of the virtual machine placement system may add other objective functions excluding the above-described objective function or exclude the above-described objective function, and finally calculate the placement schedule by using a combination of the other objective functions.

As a specific example, the objective function may further include a cost objective function considering migration cost.

The migration cost is a value considering engineering cost involved as the virtual machine is migrated, and it may be possible to implement a more accurate VM consolidation model than simply limiting the number of migrations.

The migration cost may be a value calculated considering at least one of a first cost associated with a memory size of the virtual machine, a second cost associated with a dirty page ratio of the memory of the virtual machine, and a third cost associated with application sensitivity of the virtual machine.

The virtual machine migration takes up a lot of load (resources), and downtime occurs during execution. Therefore, it must be considered to minimize migration.

The cost objective function may be an objective function for this purpose.

The virtual machine migration may be an operation of transferring the memory of the virtual machine (the memory allocated by the physical machine) via a network.

Therefore, the virtual machine migration is correlated with the memory size of the virtual machine and the dirty page ratio of the memory of the virtual machine.

In addition, the virtual machine migration affects the network sensitivity of the application (application sensitivity) because data is transmitted via the network.

For example, a virtual machine including a database or a virtual machine performing a streaming service may take a long time to migrate.

For example, the migration cost may be calculated as the sum of the first cost * the second cost * the third cost.

However, the present invention is not limited thereto, and the method of calculating the migration cost may be variously modified at a level obvious to those of ordinary skill in the art.

For example, the objective function may include "cost weight * cost objective function+second weight * second objective function+third weight * third objective function+ fourth weight+fourth objective function".

For example, the cost function may be defined as a cost value that is changed as the virtual machine is placed on the physical server, based on the case in which the cost function has the largest cost value.

For example, the second objective function is a function related to the operating time of the physical server. Specifically, the second objective function may be defined as the amount of power generated as the virtual machine is arbitrarily placed on the physical server with respect to the minimum amount of power generated when the physical server is operated.

For example, the third objective function and the fourth objective function may be expressed as one function as a function for workload stability, and may be defined as stability that changes as the virtual machine is placed on the physical server, based on the current stability of the physical server.

A virtual machine placement method, implemented by a virtual machine placement system, for placing a plurality of virtual machines on a first physical server and a second physical server in order to efficiently operate a physical server in which the plurality of virtual machines are installed, the physical server including the first physical server and the second physical server, according to the embodiment of the present invention may include: calculating a virtual machine workload that is a load imposed on the physical server by implementing the virtual machine through a predetermined workload calculation method based on information related to operations of the first physical server and the second physical server; calculating an initial predicted virtual load that is a load predicted to be imposed on the physical server by the virtual machine during a first predetermined period based on the virtual machine workload; calculating a performance index that is the performance of the physical server; calculating a placement schedule that is a schedule for placing the virtual machines on the first physical server and the second physical server by a predetermined placement schedule calculation method; and migrating the virtual machines so that the virtual machines are placed on the first physical server and the second physical server according to the placement schedule.

The virtual machine placement system and the virtual machine placement method for implementing prediction management of virtual machines considering performance degration of physical server according to the present invention may minimize data loss.

In addition, the resource consumption may be minimized.

In addition, the data center may be managed stably.

In addition, the power consumption may be effectively reduced.

In addition, the lifetime of the server may dramatically increased.

However, the effects of the present invention are not limited to those described above, and the effects not mentioned will be clearly understood from the present specification and accompanying drawings by those of ordinary skill in the art.

By considering the cost function as described above, side effects caused by performing a lot of migrations can be prevented, and smooth operation of the virtual server can be ensured due to the placement schedule considering the performance index.

In order to more clearly express the technical spirit of the present invention, components that have no relevance to the technical spirit of the present invention are briefly expressed or omitted in the accompanying drawings.

Although the configurations and features of the present invention have been described with reference to the embodiments of the present invention, the present invention is not limited thereto, and it will be apparent to those of ordinary skill in the art that various changes or modifications can be made thereto without departing from the spirit and scope of the present invention. Therefore, it is noted that these changes or modifications will fall within the scope of the appended claims.

What is claimed is:

1. A virtual machine placement system for placing a plurality of virtual machines on a first physical server and a second physical server in order to efficiently operate a physical server in which the plurality of virtual machines are installed, the physical server including the first physical server and the second physical server, the virtual machine placement system comprising:
   a workload calculation module that calculates a virtual machine workload that is a load imposed on the physical server by implementing a virtual machine by using a predetermined workload calculation method;
   a prediction module that calculates an initial predicted virtual load that is a load expected to be imposed on the physical server by the virtual machine during a first predetermined period based on the virtual machine workload;
   a temperature prediction module that predicts a temperature of the physical server during the first predetermined period based on the initial predicted virtual load;
   a schedule module that calculates a placement schedule that is a schedule in which the plurality of virtual machines are placed on the first physical server and the second physical server by a predetermined placement schedule calculation method; and
   a migration module that migrates the plurality of virtual machines so that the plurality of virtual machines are placed on the first physical server and the second physical server according to the placement schedule,
   wherein the predetermined placement schedule calculation method is a method of calculating the placement schedule when a value of an objective function is minimized based on the initial predicted virtual load,
   the objective function includes a first objective function that is a function considering a number of spots having a temperature higher than or equal to a first reference on the physical server during the first predetermined period and objective functions other than the first objective function, and
   the schedule module calculates the placement schedule by setting weights between the objective functions, and calculates the placement schedule by increasing a weight of the first objective function as the number of spots having the temperature higher than or equal to the first reference on the physical server or an average temperature of physical servers increases.

2. The virtual machine placement system of claim 1, wherein
   the schedule module calculates the placement schedule considering a constraint condition, and
   the constraint condition includes a performance condition considering a performance of the physical server.

3. The virtual machine placement system of claim 2, further comprising:
   a performance index calculation module that calculates a performance index of the physical server,
   wherein the performance condition is a condition excluding a placement of the virtual machine in the physical server having the performance index less than or equal to a predetermined performance index.

4. The virtual machine placement system of claim 3, wherein
   the performance index calculation module calculates the performance index of the physical server considering at least one of a first performance degradation value related to performance degradation of the physical server according to an operating time, a second performance degradation value related to performance degradation of the physical server according to on/off of the physical server, or a third performance degradation value related to performance degradation of the physical server according to a temperature of the physical server.

5. The virtual machine placement system of claim 1, wherein the objective function further includes at least one of a second objective function that is a function related to an operating time of the physical server during the first predetermined period, a third objective function that is a function related to an amount of change in the load of the physical server calculated by the initial predicted virtual load during the first predetermined period, and a fourth objective function that is a function related to a difference between loads of the physical servers calculated by the initial predicted virtual load during the first predetermined period.

6. The virtual machine placement system of claim 1, wherein the schedule module calculates the placement schedule by the predetermined placement schedule calculation method considering a constraint condition, and
   the constraint condition includes a first condition for excluding a placement of the virtual machine at a spot having a temperature higher than or equal to a second reference on the physical server.

7. The virtual machine placement system of claim 1, wherein the objective function includes a cost objective function considering migration cost.

8. The virtual machine placement system of claim 1, further comprising:
   a temperature sensing module that measures the temperature of the physical server; and
   a monitoring module that determines an abnormality based on a measured temperature that is the temperature of the physical server measured by the temperature sensing module and a predicted temperature that is the temperature of the physical server predicted by the temperature prediction module,
   wherein, when a first monitoring condition is satisfied, the monitoring module determines that the temperature sensing module has failed,
   when a second monitoring condition is satisfied even if the first monitoring condition is satisfied, the monitoring module does not determine that the temperature sensing module has failed, and determines that the physical server operates abnormally, and
   the first monitoring condition is a condition that the measured temperature and the predicted temperature differ from each other by a predetermined temperature or higher.

9. The virtual machine placement system of claim 8, wherein the temperature sensing module includes a temperature sensor disposed in the physical server, and a temperature calculation unit that calculates a temperature based on information provided from the temperature sensor, and
   the second monitoring condition is a condition that a proportion of temperature sensors determined as having failed among temperature sensors disposed in one physical server is greater than or equal to a predetermined reference.

10. The virtual machine placement system of claim 9, wherein, when the monitoring module determines that the physical server operates abnormally, the migration module migrates the virtual machine placed in a corresponding physical server to another physical server.

11. A virtual machine placement method, implemented by a virtual machine placement system, for placing a plurality of virtual machines on a first physical server and a second physical server in order to efficiently operate a physical server in which the plurality of virtual machines are installed, the physical server including the first physical server and the second physical server, the virtual machine placement method comprising:

calculating a virtual machine workload that is a load imposed on the physical server by implementing a virtual machine by using a predetermined workload calculation method based on information related to operations of the first physical server and the second physical server;

calculating an initial predicted virtual load that is a load expected to be imposed on the physical server by the virtual machine during a first predetermined period based on the virtual machine workload;

predicting a temperature of the physical server during the first predetermined period based on the initial predicted virtual load;

calculating a placement schedule that is a schedule in which the plurality of virtual machines are placed on the first physical server and the second physical server by a predetermined placement schedule calculation method; and migrating the plurality of virtual machines so that the plurality of virtual machines are placed on the first physical server and the second physical server according to the placement schedule, wherein the predetermined placement schedule calculation method is a method of calculating the placement schedule when a value of an objective function is minimized based on the initial predicted virtual load, the objective function includes a first objective function that is a function considering a number of spots having a temperature higher than or equal to a first reference on the physical server during the first predetermined period and objective functions other than the first objective function, and the calculating the placement schedule includes calculating the placement schedule by setting weights between the objective functions, and calculates the placement schedule by increasing a weight of the first objective function as the number of spots having the temperature higher than or equal to the first reference on the physical server or an average temperature of physical servers increases.

12. The virtual machine placement method of claim 11, wherein the placement schedule is calculate by considering a constraint condition, and the constraint condition includes a performance condition considering a performance of the physical server.

13. The virtual machine placement method of claim 12, further comprising: calculating a performance index of the physical server, wherein the performance condition is a condition excluding a placement of the virtual machine in the physical server having the performance index less than or equal to a predetermined performance index.

\* \* \* \* \*